Jan. 15, 1924.
E. B. HOFF
1,480,553
PHONOGRAPH MOTOR
Filed July 3, 1922
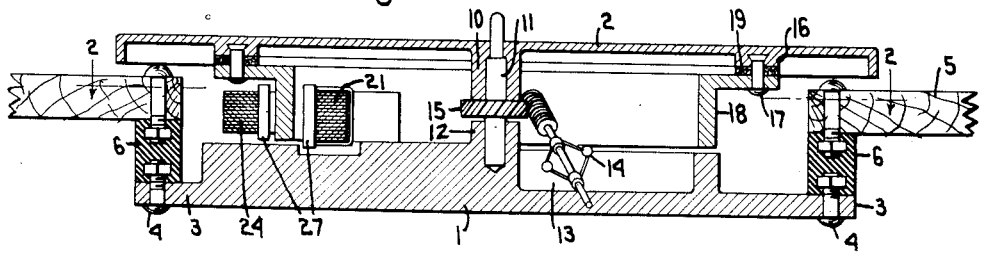
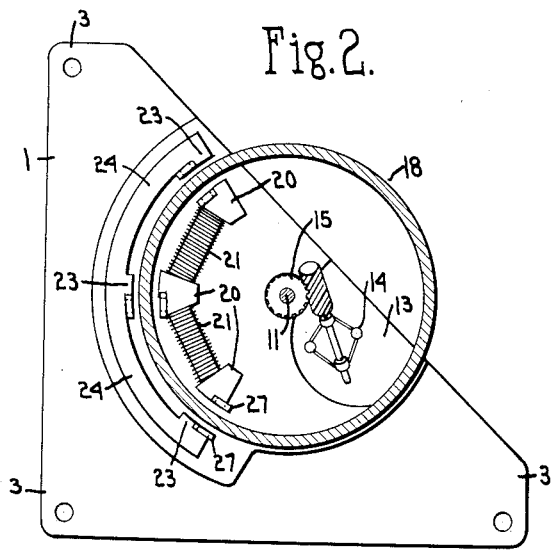
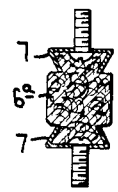
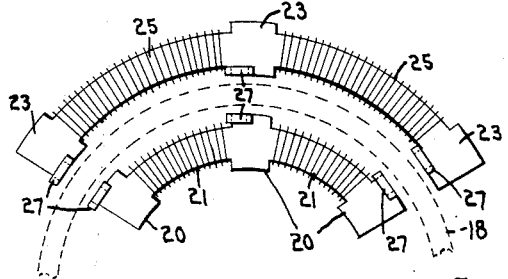
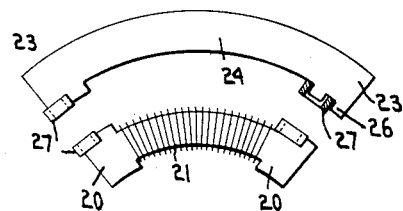
Earl B. Hoff
INVENTOR.
BY
Harold Elmo Smith
ATTORNEY.

Patented Jan. 15, 1924.

1,480,553

UNITED STATES PATENT OFFICE.

EARL B. HOFF, OF CLEVELAND, OHIO, ASSIGNOR TO THE AZOR MOTOR MANUFACTURING COMPANY, OF CLEVELAND, OHIO, A CORPORATION OF OHIO.

PHONOGRAPH MOTOR.

Application filed July 3, 1922. Serial No. 572,556.

*To all whom it may concern:*

Be it known that I, EARL B. HOFF, a citizen of the United States, residing at Cleveland, in the county of Cuyahoga and State of Ohio, have invented a certain new and useful Improvement in Phonograph Motors, of which the following is a full, clear, and exact description, reference being had to the accompanying drawings.
This invention relates to phonographs and has for its object the provision of a simple and self contained operating unit comprising a rotating disk and an alternating current motor, the parts being made of minimum vertical dimension so as to be adaptable to any existing type and design of casing or cabinet, while being of such design and construction as to produce a minimum of noise, either mechanically or electrically. Other objects of the invention are the provision of an alternating current motor of the maximum simplicity while further objects and advantages will become apparent as the description proceeds.
Previous attempts have been made to produce a device of the character just described and such devices have been successful so far as mechanical silence has been concerned but the same have been expensive to construct and not silent electrically. The magnetizing effect of an alternating current always tends to produce a monotonous hum upon a pitch corresponding to the number of cycles per second, ordinarily about sixty.
The loudness depends upon the shape of the magnetized parts, the flux density, the character and shape of adjacent metal parts, the mode of connection of those parts, and the existence of resonators of that pitch. This hum is ordinarily not objectionable but in connection with a musical instrument it would be insupportable. Generally speaking the way in which I minimize or prevent this magnetic hum is by making the cores of peculiar shape parallel to the moving part instead of perpendicular thereto as heretofore, and of such ample size as to reduce the flux density to a comparatively small value. This peculiar shape itself facilitates the desired increase of cross section, while to secure the necessary force-effect I compensate for this decrease in flux density by presenting both ends of each core to the moving member and also by employing a magnetic bridge on the opposite side of said moving member.

In the drawings accompanying and forming a part of this application I have shown certain physical forms in which my inventive idea can be embodied and by which the aforementioned objects may be secured. Fig. 1 is a vertical central section through a phonograph unit made in accordance with my invention; Fig. 2 is horizontal section along the line 2—2 of Fig. 1; Figs. 3 and 4 are diagrams showing modified forms of motor-elements; and Fig. 5 shows another form of attaching element.

In these drawings 1 represents the motor base and 2 the rotatable plate or turn-table. The former is preferably made with projecting ears or corners 3, 3 for the reception of screws 4 by which it may be secured to a cabinet or other support. Many cabinets have a flat wooden top 5 formed with a circular hole therein slightly smaller than the turntable which is designed to overlap the same at a short distance. My preferred mode of supporting my device in such a case is to suspend the ears 3 from vibration-less cushions 6 fastened around the same. In Fig. 1 I show cushions of rubber or similar material having nuts cast therein for the reception of the screws. In Fig. 5 I show a modified cushion 6ª made of felt with metallic end members 7 clamped thereon.

The members 1 and 2 are preferably die cast from alloy which exhibits good bearing properties. Numerous compositions will occur to anyone skilled in the art of die casting. The plate 2 is formed with a central boss 10 in which is cast or fastened the pivot spindle 11 while the base 1 is formed with a central boss 12 having a socket rotatably receiving said spindle. One side of the base is formed with a recess 13 in which is journaled the usual governor 14 driven by a spiral gear 15 on the spindle.

The plate 2 is also formed with a seating portion 16 having suitable studs 17 fastened thereto as by being cast therein or otherwise, and serving to secure in place the cylindrical conducting ring 18, a vibration-insulating ring 19 of felt, rubber, or other absorbing material being interposed. This ring is preferably made of copper and of considerable thickness, say three sixteenths to five sixteenths inch.

Carried by the base 1 at any convenient point is a core member comprising spaced pole pieces 20, 20 with wire-receiving portions 21 between them. These core members are arranged parallel to the direction of movement of the ring and the pole pieces are presented close to the periphery of said ring, either inside or outside at choice. I prefer to employ three pole-portions and two wire-portions as shown in Fig. 2, but the number may be increased or decreased; see Fig. 4.

On the opposite side of the ring from the core-member and parallel thereto is located a bridge member, having pole portions 23 registering with the pole-pieces 20 and connecting portions 24 between the pole pieces. It is only necessary that the connecting portions be spaced further from the ring than the pole pieces, and that the pole pieces match the first pole piece; otherwise the bridge member can be shaped substantially at will, and can even have coils 25 wound thereon as shown in Fig. 3, to supplement the effect of the core opposite thereto. This produces, in effect, two pieces slotted as shown at 26 in Fig. 4 and the corresponding portion of each pole piece is surrounded by a short-circuited shielding coil 27. The core member and the bridging member are each built up of laminations parallel to the plane of the plate 1, the poles and bodies being integral.

Having thus described my invention what I claim is:

1. In a phonograph motor, a cylindrical conducting band, a magnetizable core located on one side of said band and having spaced pole pieces presented thereto, wire wound on said core between adjacent pole pieces, and a magnetizable bridge member located upon the opposite side of said band from said pole pieces and having a pole piece opposite each of said first pole pieces, corresponding portions of all of said pole pieces being magnetically shielded.

2. In a phonograph motor, a cylindrical conducting band, a magnetizable core located on one side of said band and extending substantially parallel to the direction of motor thereof, said core having a plurality of pole pieces presented to said band and smaller portions between adjacent pole pieces having wire coils thereon, the axes of which are located circumferentially of said band, and a magnetizable bridge member located upon the opposite side of said band from said core, said bridge having pole pieces registering with said first pole pieces and presented close to the surface of the band and connecting portions integral with the pole pieces and spaced further from said band, all of said pole pieces having shielded portions similarly arranged.

3. In a phonograph motor, a metallic conducting band having its opposed faces parallel and defining surfaces of revolution, a core member having a plurality of pole pieces presented to one side of said band and smaller portions between and integral with said pole pieces and having wire coils wound thereon, a bridging member located upon the opposite side of said band and having pole pieces matching the first pole pieces, and connecting portions between said pole pieces, and means for producing a split magnetic phase in said poles.

4. In a phonograph motor, a metallic conducting band having its opposed faces parallel and defining surfaces of revolution, a pair of elongated parallel magnetizable members located upon opposite sides of said band, each member having pole pieces which approach the corresponding pole pieces of the other member upon opposite sides of the band and connecting portions between said pole pieces spaced from the surface of said band, the connecting portions of at least one of said members being wound with wire, and corresponding portions of all the pole pieces being magnetically shielded.

5. In a phonograph, in combination, a circular plate of non-magnetic metal, a vertical central spindle rotatably supporting said plate, a cylindrical conducting band secured to said plate concentric with said spindle, the securing means including a vibration-insulating cushion, and a core member having its axis parallel to the direction of rotation of said band and having a plurality of poles, presented to the same surface of said band.

6. In a phonograph, in combination, a circular plate mounted for axial rotation, a cylindrical conducting band rotatable therewith, a core member having a plurality of coils of wire wound thereon at spaced longitudinal points, there being a pole piece at each end of each coil presented to said band and the axes of the coils being substantially parallel to the adjacent portion of the band.

In testimony whereof, I hereunto affix my signature.

EARL B. HOFF.